Feb. 9, 1932.  R. G. WHITE  1,844,305
CHILD'S CONVEYANCE
Filed May 2, 1930  2 Sheets-Sheet 1
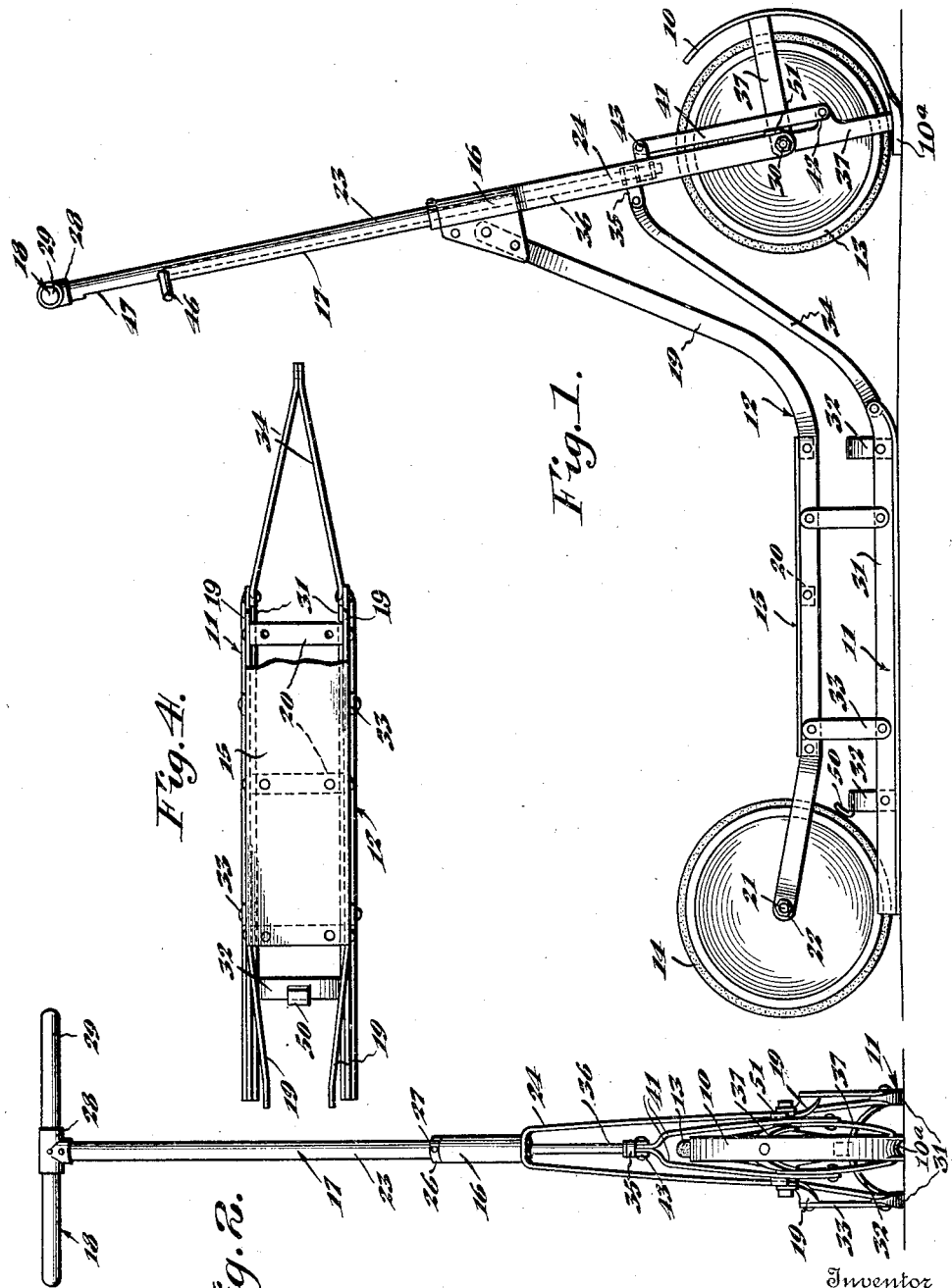
Inventor
Richard G. White
By
Wood & Wood Attorneys Feb. 9, 1932.    R. G. WHITE    1,844,305
CHILD'S CONVEYANCE
Filed May 2, 1930    2 Sheets-Sheet 2
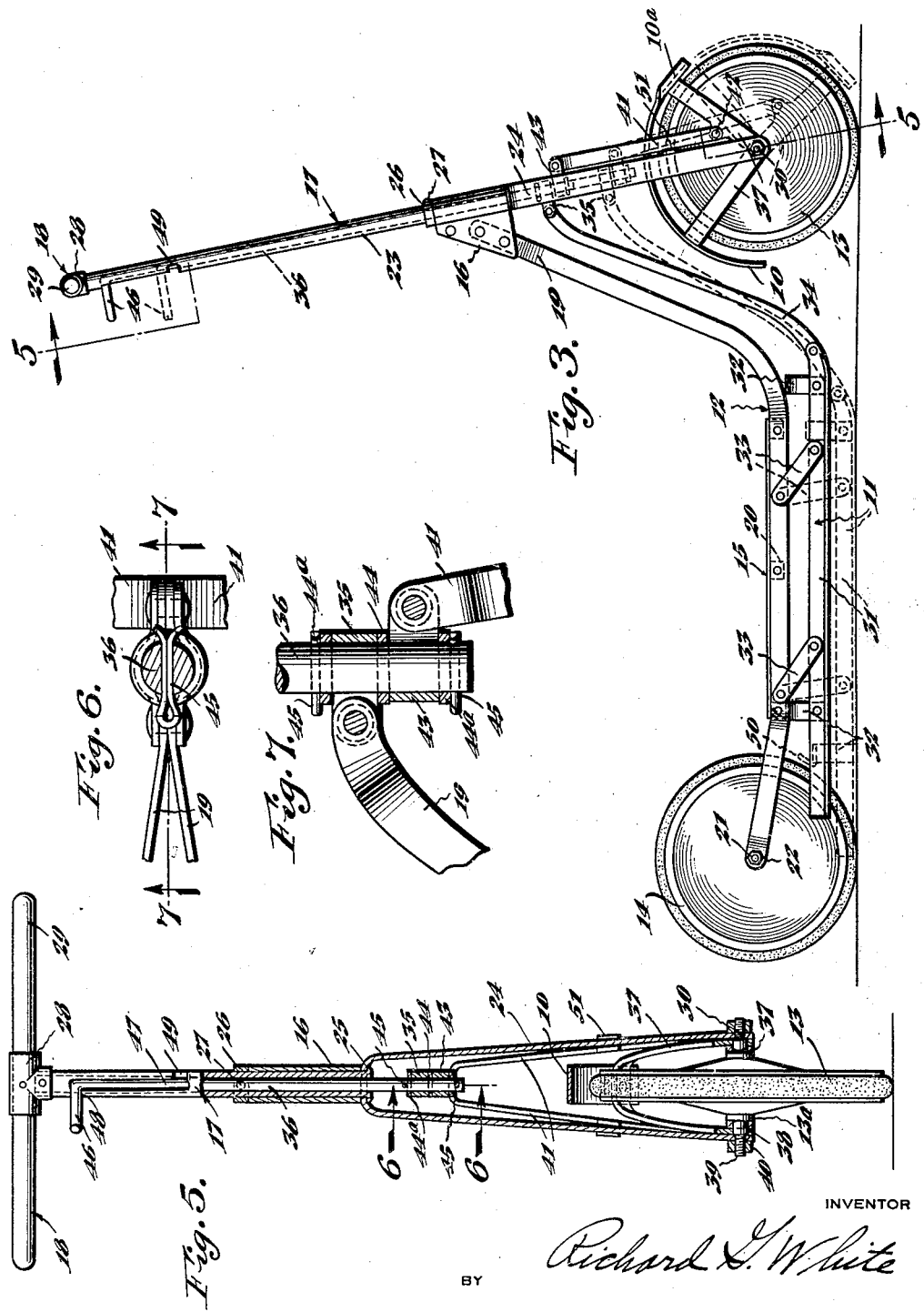
INVENTOR
Richard G. White
BY
Wood & Wood  ATTORNEYS Patented Feb. 9, 1932

1,844,305

UNITED STATES PATENT OFFICE

RICHARD G. WHITE, OF MARIEMONT, OHIO

CHILD'S CONVEYANCE

Application filed May 2, 1930. Serial No. 449,140.

This invention relates to playthings and is particularly directed to a vehicle or conveyance for children. The conveyance includes means for converting it either into a child's vehicle of that type known as a "scooter" or into a sled or ice runner. For both uses the device includes a platform and a steering post or fork. The platform and fork in the instance of the scooter are mounted on wheels whereas in the instance of the sled a runner is disposed beneath the platform in place of the rear wheel and a steering runner is moved into position beneath the steering wheel.

It is therefore an object of this invention to provide a child's conveyance which constitutes a combination "scooter" and sled. When converted into a sled the conveyance necessitates substantially the same balancing and steering action as used in the scooter, although by the use of slightly laterally spaced rear runners, it is possible for the device to be placed in upright unsupported position.

It is another object of this invention to provide an easily and conveniently operable means adjacent the handle of a steering fork for disposing the runners in operative position beneath the wheels, which means includes positive locks which insure the maintenance of the runners either in fixed operative position or inoperative position as desired.

Still another object of this invention is to provide a conveyance of the convertible nature described in which the mounting of the runners in operative position is exceedingly stable and to further provide that the conveyance when used on ice is easily controlled and maneuvered.

Another object of this invention is to provide runners of the above described nature in combination with a "scooter", which runners may be lowered into operative position and used as a stand for supporting the scooter in upright position, and to further provide that these runners may be lowered into contact with the ground while the scooter is in motion on its wheels and thereby used as a brake or drag for decelerating the "scooter."

Other objects and certain advantages will be more fully apparent from a description of the accompanying drawings, in which:

Figure 1 is a side elevation of the plaything or child's vehicle illustrating the ice runners in operative position and the conveyance, therefore, being used as an ice "scooter" or sled.

Figure 2 is a front view of the conveyance.

Figure 3 is a side elevation taken similar to Figure 1 but showing the ice runners in inoperative position drawn up on the "scooter" frame whereby the conveyance is operated on wheels.

Figure 4 is a fragmentary top plan view of the platform portion or body of the conveyance.

Figure 5 is a sectional view taken on line 5—5, Figure 3, detailing the means for shifting the runners.

Figure 6 is an enlarged fragmentary sectional view taken on line 6—6, Figure 5 illustrating the control connections between the operating rod for shifting the runners and the runners.

Figure 7 is a sectional view taken on line 7—7, Figure 6, further detailing the connection shown in Figure 6.

Referring to the drawings, the runners 10, 11, front and rear respectively, of the conveyance are mounted for movement relative to the frame 12 of the device for interposition between the wheels 13, 14, front and rear respectively, and the ground. The frame 12 of the scooter upon which these runners are mounted includes a platform 15 having a single wheel 14 mounted at its rear end. This forward end of the frame extends upwardly and has a swivel bracket 16 fixed thereto in which bracket the steering fork is rotatably mounted. The steering fork or post 17 includes the single wheel 13 at its lower end and a handle 18 at its upper end.

The platform more specifically described comprises a flat plate as the true platform surface, which plate is mounted on a pair of longitudinally disposed chassis rails 19. At the point of support for the platform, these pieces are widely spaced apart by means of a plurality of cross rails 20 or straps riveted thereto presenting top cross surfaces of the rails flush with the tops of the rails 19. The platform plate is riveted in position on these cross rails.

The longitudinal rails 19, toward the rear of the conveyance, extend closer together and lie against the opposite hubs of the rear wheel 14. An axle bolt 21 mounts the wheel in the arms of the frame pieces and is held in position by means of a nut 22. Forwardly the rails 19 extend upwardly and angularly beyond the platform and are riveted in position between the radially extending arms of the swivel bracket 16. The bore of this bracket is slightly tilted from a vertical angle so that the steering post mounted therein is inclined to place its handle slightly rearwardly and its wheel forwardly.

The post is formed of a tubular upper section 23 and a metal strap attached to the lower end of the tube, bent to form a bifurcated lower end or fork 24 for the post. The tube has its lower end swaged to provide a head engaging the margin of an aperture in the crotch of the fork. This headed lower end 25 of the tubular section is permanently fixed to the fork by welding or any other suitable means. The shoulder formed on the juncture of the tubular member and the fork is engaged against the under side of the swivel bracket 16 and the tubular section 23 extends upwardly therethrough. A collar 26 is mounted on the tubular section and secured against the upper end of the swivel bracket by means of a set screw 27 for definitely positioning the post in the bracket.

The handle 18 at the top of the fork includes a pipe tee 28 fixed to the upper end of the tubular section and carrying a cross bar 29 providing grip portions at each side of the tube. The forked lower end of this steering element straddles the steering wheel, the wheel being mounted by means of its trunnions 30, extending through the respective arms of the fork.

The main runner 11 is hung beneath the platform and the steering runner 10 is mounted on the axis of the steering wheel, these runners being coincidentally moved into position for converting the conveyance into an ice scooter by means mounted in the fork. For the rear runner, a pair of spaced runner members 31 are joined by means of cross rails 32, these cross rails being upwardly bowed or of arcuate form so that they do not constitute an obstruction between the runners. The runner members are T-shaped in cross section, the shank of the T extending upwardly to provide the attaching means for the runners for joining the same together and for attaching them to the platform. The attachment of these joined runners to the platform is by means of links or standards 33 there being two of these links at each side of the conveyance connected to a respective runner member. The links are pivotally connected to the respective parts so that the ice runners may be swung into position when desired.

The forward ends of the runners are rounded upwardly and each has the lower end of a respective connecting link 34 pivotally attached thereto. These links extend upwardly and are engaged and pivotally mounted between the arms of a collar 35 mounted on the lower end of a control rod 36 telescopically mounted in the tubular section of the post.

The forward runner 10 is semicircular in form being mounted concentric with the wheel. This runner is rotatively mounted on the trunnion of the wheel by means of radially extending brackets 37. There are two of these brackets each being of forked design straddling the wheel and having the semicircular runner riveted to the outer surfaces of the respective bights thereof.

Each trunnion of the wheel includes a shank 38 and a screw threaded portion 39. Each respective arm of the steering fork is engaged against the shoulder between the shank and the screw threaded portion by means of a nut 40 and the respective arms of the runner brackets 37 are engaged upon the shanks and between the arms of the steering fork and the hub 13$^a$ of the wheel, these fork supports, therefore, being loosely rotatively mounted.

The semicircular forward runner 10 includes at its lower end a straight or tangential portion. This portion, indicated at 10$^a$, is adapted to contact the ice or snow when the runner is in operative position and to provide sufficient longitudinal extent for the above described engagement. This straight portion 10$^a$ is semicircular in cross section as opposed to the normal flat width of the runner for the purpose of providing sharp edges defining steering edges.

Normally or in operative position the semicircular runner is disposed around the upper portion of the wheel. A pair of links 41, one element of the pair at each side of the wheel, are connected to the respectively opposite arms of a forward bracket by pivot pins 42, these links extending upwardly and being pivotally secured together between the arms of an attaching collar or ring 43 mounted on the control rod 36 just below the previously mentioned attaching collar or ring 35.

The respective rings are spaced apart by a washer 44 and are held against the spacing washer and in definite position on the rod by means of cotter pins 45, above and below the same, engaging washers 44$^a$ against the respective upper and lower sides of the mounted rings. This connection of the operating links for the respective runners to the rod is therefore within the steering fork and loosely rotatively on the control rod. The control rod extends up through the tube and has a laterally extending handle portion 46 extending radially through a longitudinal slot 47 in the tube at its upper end. The longitudinal slot terminates at its upper and lower ends in circumferentially disposed slots 48, 49 respectively, the lower edges of which are concave to provide a definite seat and lock for the handle portion when swung into the same.

The longitudinal extent of the slot 47 is sufficient to permit shifting of the rod a distance capable of causing movement of the runners from totally inoperative position to fully operative position, it being apparent that when the handle is in the upper horizontal slot the runners are inoperative (see Figure 3). When the handle of the control rod is moved downwardly in the slot, the forward runner is rotated about the axis of the wheel, by means of the link connecting to the bracket of the runner, into the position shown in Figure 1 wherein the forward steering runner is disposed beneath the wheel and against the ice. Coincidentally, with this movement of the forward or steering runner, the main runner of the conveyance has been swung on the links into the position shown in Figure 1 whereby the links are disposed in vertical position with the runners disposed under the rear wheel and against the ice. With this use of the conveyance, the links become supporting standards and the steering fork for the forward wheel becomes a steering fork for the forward ice runner.

A brace 50 is provided for the main runner 11 being fixed to the rear cross piece of the runner and engageable against the rear wheel. An angle piece is used for this purpose disposing an upward flange against the wheel. This braces the rear runner against rearward collapse or further rearward swinging movement of the links or standards.

The forward runner is braced against further rotation by means of the engagement of laterally extending flanges 51 of the links against the lower ends of the arms of the steering fork (see Figures 1 and 5).

It will readily be apparent that it takes but a moment to convert the conveyance from an ordinary ground vehicle to an ice runner merely by rotating the shift rod out of the circumferential slot into alignment with the vertical slot moving the same downwardly the extent of the vertical slot and rotating it into the lower horizontal slot.

If it is desired to use the runners as a stand for the conveyance, they are disposed in operative position as disclosed in Figure 1 and the utility as a stand is readily apparent due to the spaced members thereof. When the scooter is in motion on its wheels, the child may operate the runners as a brake by lowering the same, by means of the shift rod, into contact with the ground (see dotted lines Figure 3) by partial downward movement of the operating or shift rod.

Having described my invention, I claim:

1. In a conveyance for children, a frame including a platform, a steering post at the forward end of the frame, a wheel mounted on the rear end of the frame, a wheel mounted on the steering post, an ice runner hung beneath the platform, a steering ice runner rotatively mounted on the axis of the steering wheel, and means associated with the steering fork and connected to the respective runners for coincidentally moving said runners into position beneath the wheels.

2. In a device of the class described, a frame including a platform, a wheel mounted at the rear end of the frame, a steering post and wheel mounted in the forward end of the frame, a runner hung beneath the platform, a steering runner rotatively mounted on the axis of rotation of the forward wheel, a shift rod mounted longitudinally of the steering post and including a handle at the upper end, links connecting the lower end of the shift rod with the respective runners, and means for determining the operative and inoperative position for the runners, said means associated with a handle of the shift lever whereby the runners may be disposed under the wheels.

3. In combination with a child's vehicle including a platform, a steering post mounted for swivelling movement at the forward end of the platform, a wheel supporting the rear end of the platform and a wheel at the lower end of the steering post; a runner pivotally hung beneath the platform, a semicircular steering runner mounted on the axis of rotation of the steering wheel for rotation thereon, a shift rod telescopingly engaged through the steering post, and links connecting the respective runners to the end of said post whereby the runners are coincidentally shiftable into position beneath the wheels.

4. A convertible conveyance for children, comprising, a frame having a platform thereon, a steering post mounted at the forward end of the frame, a rear wheel for the frame, a forward wheel mounted at the end of the steering post, runners mounted beneath said platform, and a shift rod mounted on the steering post for moving said runners into position beneath the wheels for lifting the wheels from contact with the ground.

5. In a device of the class described, a frame including a platform, a steering post mounted at the forward end of the frame including a wheel, a wheel mounted at the rear of said frame, an ice runner movably supported beneath said platform, a semicircular ice runner rotatively mounted concentrically with the forward wheel on the axis of rotation thereof, and means for coincidentally moving said runners into position beneath the wheels, and a brace on said ice runner beneath the platform for abutting the rear wheel when said ice runner is in operative position.

6. In a device of the class described, a frame including a platform, a wheel supporting the rear end of said platform, a steering post including a wheel mounted for supporting the forward end of said frame, runners mounted on the frame and steering post respectively, a shift rod telescopingly mounted in the steering post, links connecting the lower end of the post to the respective runners, a handle extension at the upper end of said shift rod extending radially from the post, said post having a longitudinal slot therein traversed by said handle extension, said slot terminating at its upper and lower ends in circumferentially disposed slots whereby said shift rod may be definitely set into position against telescoping movement by rotation of said handle extension into said circumferential slots.

7. In a scooter including, a frame, a steering post on the frame, a wheel on the frame, and a wheel on the steering post, ice runners shiftably mounted on said frame and steering post respectively, and means mounted on the steering post connected to said ice runners and extended to the upper end of said steering post for shifting the runners into operative position beneath the wheels.

In witness whereof, I hereunto subscribe my name.

RICHARD G. WHITE.